121,525

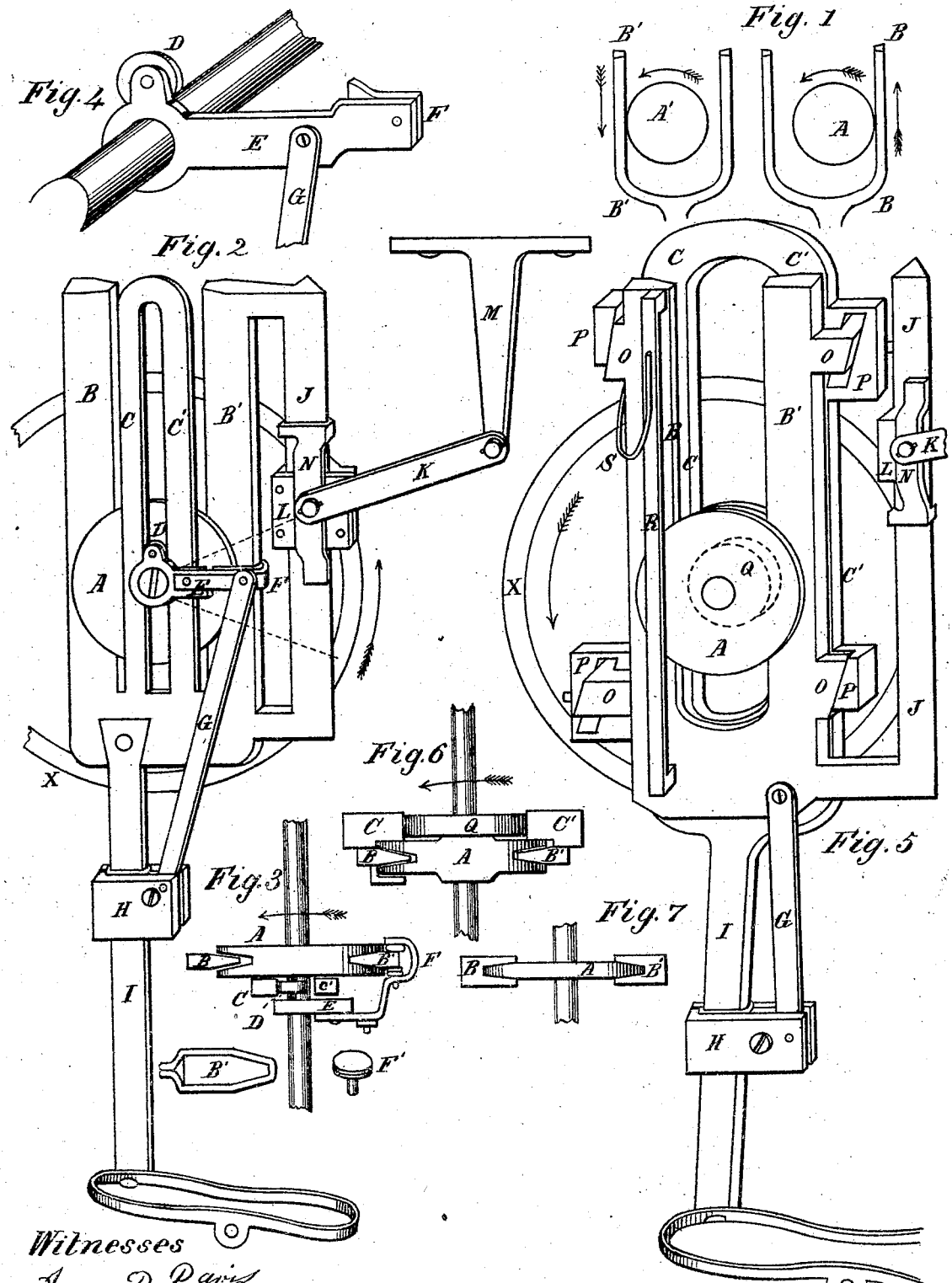

UNITED STATES PATENT OFFICE.

GEORGE BYRON KIRKHAM, OF NEW YORK, N. Y.

IMPROVEMENT IN FOOT-POWERS.

Specification forming part of Letters Patent No. 121,525, dated December 5, 1871.

*To all whom it may concern:*

Be it known that I, GEORGE BYRON KIRKHAM, of the city, county, and State of New York, have invented a new and useful Improvement in Foot-Powers; and I do hereby declare the following to be a full, clear, and exact description of the same sufficient to enable one skilled in the art to which the invention appertains to make use of it, reference being had to the accompanying drawing which forms part of this specification, and in which—

Figure 1 represents the principle on which the improvement is founded. Fig. 2 represents a general plan of the invention with one modification. Fig. 3 represents an end view of the same. Fig. 4 shows a plan of the lever. Fig. 5 represents a general view of the invention with another modification. Fig. 6 shows an end view of the same. Fig. 7 shows a modification of the wheel and bearings.

In this invention my object is to provide a new foot-power for sewing-machines and other light machinery, which shall be noiseless and will always drive the fly-wheel around in the right direction no matter how the treadle is started, whether up or down.

The general principle which governs this improvement is well represented in Fig. 1. B B represent the double pitman which leads from the treadle, and A the wheel to which the power is to be applied. Now, when the pitman rises its right side is brought against the wheel, which causes the wheel to revolve in the direction of the arrow. But when the pitman descends, as at A′ B′ B′, its left side is pressed against the wheel, which still causes the wheel to revolve in the direction of the arrow. In order to cause this shifting motion of the double pitman I have several appliances, which are shown in the different figures, and which I intend to use either singly or together, according as the power required may be small or very great. In Fig. 2, X represents the fly-wheel, on the axle of which is firmly fastened the wheel A. The wheel A is deeply grooved, as shown at Fig. 3, and in the groove, and pressed against it alternately, is the double pitman B B′. The sides of the groove in A are at such an angle that a very moderate pressure against the back of B or B′ will cause great traction and force the wheel A to revolve, and with it, of course, the fly-wheel X, when B B′ goes up or down. Here I would remark that, instead of the wheel A being grooved, I could have the groove in the arms B B′, and bevel the wheel to fit in them. This is shown in Fig. 7. To make the traction between A and the arms B B′ greater I propose to incase the arms B B′ in leather or other suitable material, as shown at B″, Fig. 3. Connected with the double pitman B B′, and forming part of it, are the two arms C C′, Fig. 2. These form bearings for the little wheel D on the lever E to operate against. This lever E is also shown at Fig. 3. It turns freely on the same axle that the wheels A and X are fastened to. It has a spring, F, which presses or bears against the arm B′. When B B′ is raised it carries F with it, which presses the little wheel D against C, thus bringing the arm B′ tightly into the groove of A, causing A to revolve. When the pitman B B′ is depressed it carries F down with it, pressing D against C′, and bringing B into the groove of A and continuing the motion of A in the same direction. The spring F is faced with leather, as shown at Fig. 3, and has a little button, F′, also faced with leather. A slight change in shape is shown in Fig. 4. To give the lever E F greater power over the wheel D and bearings C C′ there is added an arm, G, with a slide, H, which slides on a rod of the pitman I. The slide H is faced with leather where it presses against I. To aid in the shifting of B B′ an additional bearing, J, is added, and on it another slide, L, with an arm, K, pivoted to the standard M, which is fastened to the frame of the machine. The slide L has a spring, N, which causes the slide L to press tightly against the triangular sides of J. At Fig. 5 a modification of the double pitman is shown. Here B B′ and C C′ are separate pieces, and the arms B B′ slide in grooves in the bearings C C′, as shown at O P, O P, &c. The bearings C C′ rest against a wheel, Q, which turns freely on the same axle that A is fastened to, (also shown at Fig. 6;) and these bearings C C′ do not shift; but the arms B B′ are shifted, being operated by the slides and arms H G and L N K, already explained, and also by the diagonal shape of the slides O P. To aid the shifting motion of B B′, a bearing, R, pressed against the wheel A by the spring S, is added to it.

Having described my invention, what I claim therein as new, and desire to secure by Letters Patent, is—

1. I claim broadly a double pitman, B B', operating alternately against opposite sides of the wheel A, as and for the purpose hereinbefore set forth.

2. The arrangement of the grooved or beveled wheel A and arms B B', also grooved or beveled, the bearings C C', and pitman-arm I, as and for the purpose hereinbefore set forth.

3. The lever E F and wheel D, also the arm G and slide H, as and for the purpose hereinbefore set forth.

4. The arrangement of the bearing J and slide L, spring N, arm K, and standard M, as and for the purpose hereinbefore set forth.

5. The arrangement of the arms B B', bearing C C', and wheel Q, also the slides O P O P, as and for the purpose hereinbefore set forth.

GEORGE BYRON KIRKHAM.

Witnesses:

JAMES D. DAVIS,
H. M. PAIN.

(143)